United States Patent
Heyne et al.

(10) Patent No.: US 10,994,628 B2
(45) Date of Patent: May 4, 2021

(54) CHARGING SYSTEM HAVING AT LEAST ONE CHARGING COLUMN FOR ELECTRIC VEHICLES AND METHOD FOR CHARGING ONE OR MORE ELECTRIC VEHICLES

(71) Applicant: Dr. Ing. h.c. F. Porsche Aktiengesellschaft, Stuttgart (DE)

(72) Inventors: Raoul Heyne, Wiernsheim (DE); Florian Joslowski, Leinfelden-Echterdingen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 272 days.

(21) Appl. No.: 16/266,291

(22) Filed: Feb. 4, 2019

(65) Prior Publication Data
US 2019/0241089 A1 Aug. 8, 2019

(30) Foreign Application Priority Data
Feb. 6, 2018 (DE) .......................... 102018102566.1

(51) Int. Cl.
| | |
|---|---|
| B60L 53/63 | (2019.01) |
| B60L 53/14 | (2019.01) |
| B60L 53/31 | (2019.01) |
| B60L 53/53 | (2019.01) |
| B60L 53/67 | (2019.01) |
| H02J 7/00 | (2006.01) |

(Continued)

(52) U.S. Cl.
CPC .............. *B60L 53/63* (2019.02); *B60L 53/14* (2019.02); *B60L 53/31* (2019.02); *B60L 53/53* (2019.02); *B60L 53/67* (2019.02); *H02J 7/0027* (2013.01); *H02J 7/342* (2020.01); *B60L 2210/10* (2013.01); *H02J 7/022* (2013.01)

(58) Field of Classification Search
CPC ....................................................... B60L 53/63
USPC ........................................................ 320/109
See application file for complete search history.

(56) References Cited

U.S. PATENT DOCUMENTS

| | | | | |
|---|---|---|---|---|
| 10,131,329 B1 | 11/2018 | Herke et al. | | |
| 10,857,902 B2 * | 12/2020 | Goei | ....................... | B60L 53/62 |

(Continued)

FOREIGN PATENT DOCUMENTS

| | | |
|---|---|---|
| DE | 102009046422 A1 | 5/2011 |
| DE | 102013200949 A1 | 7/2014 |

(Continued)

*Primary Examiner* — Jerry D Robbins
(74) *Attorney, Agent, or Firm* — RatnerPrestia

(57) ABSTRACT

A charging system includes a charging station, at least one first charging column, which has one or more charging plugs, a buffer store for storing energy, a mains connection for providing energy to the charging station and a switching apparatus, which is configured to conduct the flow of energy from the buffer store and/or from the mains connection to the first charging column. The system can also have a second charging column, which has one or more charging plugs. The switching apparatus is provided in such a way that it distributes the flow of energy from the buffer store and/or the mains connection over the two charging columns or conducts the flow of energy to one of the two charging columns. Furthermore, a method for charging one or more electric vehicles by the charging system at the charging station is described.

10 Claims, 2 Drawing Sheets

(51) Int. Cl.
*H02J 7/34* (2006.01)
*H02J 7/02* (2016.01)

(56) References Cited

U.S. PATENT DOCUMENTS

| | | | |
|---|---|---|---|
| 2008/0067974 A1* | 3/2008 | Zhang | B60L 53/65 |
| | | | 320/104 |
| 2011/0175569 A1 | 7/2011 | Austin | |
| 2011/0291616 A1 | 12/2011 | Kim et al. | |
| 2012/0200256 A1 | 8/2012 | Tse | |
| 2012/0280655 A1* | 11/2012 | Schneider | B60L 53/53 |
| | | | 320/109 |
| 2013/0113413 A1* | 5/2013 | Harty | H01M 10/465 |
| | | | 320/101 |
| 2013/0169227 A1 | 7/2013 | Tremblay et al. | |
| 2015/0202973 A1* | 7/2015 | Chang | H02J 7/0077 |
| | | | 320/101 |
| 2016/0137082 A1 | 5/2016 | Jefferies et al. | |
| 2016/0193932 A1 | 7/2016 | Vaghefinazari | |
| 2019/0351781 A1* | 11/2019 | Ben David | B60L 53/62 |

FOREIGN PATENT DOCUMENTS

| | | |
|---|---|---|
| DE | 102015110023 A1 | 12/2016 |
| DE | 102015211683 A1 | 12/2016 |
| EP | 3035478 A1 | 6/2016 |
| WO | 2013032519 A1 | 3/2013 |
| WO | 2013137232 A1 | 9/2013 |

* cited by examiner

CHARGING SYSTEM HAVING AT LEAST ONE CHARGING COLUMN FOR ELECTRIC VEHICLES AND METHOD FOR CHARGING ONE OR MORE ELECTRIC VEHICLES

CROSS-REFERENCE TO RELATED APPLICATION

This application claims priority to German Patent Application No. DE 10 2018 102 566.1, filed Feb. 6, 2018, which is incorporated by reference herein in its entirety.

FIELD OF THE INVENTION

The present invention relates to a charging system and to a method for charging electric vehicles. In particular, the present invention relates to a charging system having a charging station, at least one first charging column and optionally a second charging column for charging electric vehicles and a method for charging electric vehicles by means of a charging system, which has a charging station, at least one first charging column and optionally a second charging column. In particular, the charging system is a charging system for electrically driven passenger cars.

BACKGROUND OF THE INVENTION

Electromobility has taken on increasing importance in recent years. To promote the proliferation of electric vehicles, it is desirable for the charging procedure for an electric vehicle to be quick, uncomplicated and possible at any time. In this case, within the context of good accessibility of electric filling stations, it is possible to charge a plurality of vehicles at one charging column having a plurality of charging plugs. In the charging columns having a plurality of charging plugs, one current source is used to charge a plurality of vehicles. The power is then distributed over all of the connected vehicles. However, this reduces the power that can be applied per vehicle and extends the charging times of the electric vehicles.

Most modern charging columns are built so that they contain a power electronics system and operate one to three charging plugs using same. If more than one charging column is provided, one power electronics system is also provided for each charging column. The power electronics system transforms the current and the voltage from a mains connection such that the current and the voltage at the charging plugs have the appropriate form (DC or AC) and magnitude for being able to charge an electric vehicle (for example direct current in the region of 48 A).

European application EP3035478 A1, which is incorporated by reference herein, describes a charging station for providing electrical energy for an electrically operable vehicle and an arrangement of a plurality of charging stations, which are connected to a power supply network. US2011/291616A, which is incorporated by reference herein, relates to a charging device, which has a charging arrangement having an AC terminal for feeding the alternating current, a rectifier for converting the AC voltage to a DC voltage, and a DC terminal for outputting the direct current. US2011/175569A, which is incorporated by reference herein, describes a controller for a charging station. US 2013/169227A, which is incorporated by reference herein, deals with a modular charging station having a controller and a switch for switching the energy feed on and off. US 2016/137082A, which is incorporated by reference herein, describes an auxiliary adapter, which makes it possible to charge two electric vehicles at a single charging connection at the same time. US2016/193932A, which is incorporated by reference herein, provides a charging station expander, which receives electrical energy from a charging station and distributes the electrical energy to at least one electric vehicle.

SUMMARY OF THE INVENTION

Described herein is a charging system for electric vehicles that can be adjusted in the most flexible manner possible to various charging scenarios with respect to providing energy to and dividing same over a plurality of charging columns.

In accordance with the invention, a charging system having a charging station, at least one first charging column, which has one or more charging plugs, and a mains connection for providing energy to the charging station is provided. The charging system according to aspects of the invention can have at least one second charging column. The charging system also comprises a buffer store, in particular a buffer store and a mains connection for providing energy to the charging station. The buffer store may be a buffer store that can be divided, which, in a charging system having two charging columns, can be switched individually with respect to each of the charging columns or can be connected in interconnected fashion to one of the charging columns together with the mains connection. The charging system furthermore has a switching apparatus, wherein the switching apparatus is configured to conduct the flow of energy from the buffer store and/or the mains connection to the first or second charging column.

Owing to the apparatus according to aspects of the invention, at least the first or second charging column can be supplied with energy using one or more charging plugs of the charging system. In particular, when two charging columns are present in accordance with embodiments described herein, the charging system makes it possible to embody the energy provision and the energy division over the charging columns in a plurality of combinations. In this case, in particular due to the buffer store, the charging system can be charged using low mains powers and can output high powers for charging electric vehicles. The arrangement according to aspects of the invention having buffer store and switching apparatus permits the maximum energy that can be provided at one charging column or at each of two charging columns to be provided.

In accordance with further exemplary embodiments, the charging system can have a second charging column having one or more charging plugs. In general, the charging system described here can also have more than two charging columns. Within the context of the present description, the charging system presented here having two charging columns may be representative of a system having more than two charging columns (for example three, four, five or more charging columns). In particular, the switching apparatus can be configured to distribute the flow of energy from the buffer store and/or the mains connection over the two charging columns or to conduct said flow of energy to one of the two charging columns. In one charging scenario, the energy for charging the at least one electric vehicle can be drawn primarily from the mains connection and the buffer store can be used to close a possibly arising energy gap. Owing to a flow of energy coming mainly from the mains connection, the buffer store can be protected since it is thus exposed less often to discharging and charging operations.

In accordance with embodiments described herein, the buffer store can be distributed over the individual columns by way of battery division so that the current does not have to be divided between the charging points but can be provided in full for each charging point. For the flexible provision of the energy at two charging columns, the flow of energy from the buffer store can be both divided over the two charging columns (in the case of simultaneous charging at both charging columns) and combined (in the case of charging at just one charging column). As a result, the flexibility of the charging system for different situations is increased so that, in particular, the charging time for the customer can be reduced, as a result of which the acceptance of electromobility is increased.

In one embodiment, the charging system according to aspects of the invention comprises a mains connection, in particular a mains connection for charging the buffer store. The buffer store can be charged by way of the mains connection, wherein the mains connection can be designed for low powers, for example powers in the region of approximately 10 kW to 300 kW. On account of the fact that one mains connection having a lower power suffices for the charging system according to aspects of the invention, which reduces the demands on a potential installation site of the charging system, the charging system in accordance with embodiments described herein can be used in a flexible manner and can contribute to the further proliferation of electromobility.

In accordance with one embodiment, the buffer store has a battery. In particular, the buffer store can have a rechargeable battery. As an alternative or in addition, the buffer store according to aspects of the invention is divided into a respective battery or battery unit for each charging column. In this case, each battery or battery unit is typically associated with one charging column. The design of the buffer store as a battery and the division into a respective unit per charging column make it possible to realize various switch situations and thus to achieve great flexibility during the charging operation at the two charging columns. Flexible connection of the buffer store and situation-dependent distribution of the energy over the charging columns can thus be realized in a simple manner. In accordance with embodiments described herein, a battery that is associated with a charging column can be assigned or allocated to said charging column (in particular assigned or allocated in a switchable manner) and/or can be located in said charging column. In one embodiment, although a battery can be assigned or allocated to a charging column, it can be located in the charging station, in particular outside of the charging column. An association, as it is used herein, can typically mean a 1:1 assignment of a battery to a charging column, wherein the batteries can be located in the charging station or in the respective charging column.

The buffer store can typically be arranged in the charging columns of the charging system. In particular, the batteries or battery units of the buffer store can be arranged in the charging columns. In other embodiments, the charging system can consist of two units: a charging station, which contains the power electronics system and the buffer store (and further elements, such as the cooling system, for example), and the charging columns having the charging plugs. This promotes a compact design of the charging columns. In this case, the charging columns can also be installed at a distance from the charging station (for example at a distance of a few tens to a few hundreds of meters).

In accordance with embodiments described herein, the switching apparatus is formed in such a way that the maximum energy of the charging system can be provided at each of the charging columns. The provision of a buffer store for the charging columns, the division of the buffer store and the interconnection of individual parts or units of the buffer store make an increased charging power that is optimally adjusted to the corresponding charging situation possible at the two charging columns. As a result, the charging times at the charging system according to aspects of the invention can be optimized.

In a further refinement of the invention, the two charging columns can be operated by two power electronics systems, wherein the energy is already transmitted to the charging columns as direct current/DC voltage. The power electronics systems can preferably be accommodated in the charging station. In addition, the two power electronics systems can be identical. The power electronics systems permit the charging columns to be actuated in a flexible manner. In particular, the charging situations of the two charging columns can be evaluated independently of one another and the charging schedule can be coordinated therewith.

In one refinement of the charging system according to aspects of the invention, the buffer store can have a first battery (or first battery unit) for the first charging column and a second battery (or second battery unit) for the second charging column, wherein the first battery can be coupled to the second charging column (and the charging plugs thereof) and the second battery can be coupled to the first charging column (and the charging plugs thereof). In particular, the switching apparatus permits such a connection. As a result, both great flexibility and provision of energy to the respective charging column according to requirements are achieved. The first battery unit and the second battery unit can typically be accommodated in the respectively corresponding charging column or in the charging station.

The capacitance of the buffer store can typically be designed so that at least two electric vehicles, for example electrically operated passenger cars, can be supplied with energy or charged. In accordance with some embodiments, the capacitance of the buffer store can be selected to be so great that it can supply energy to a number of electric vehicles that corresponds, for example, at least to the number of charging columns. Using a capacitance of the buffer store selected to be great in this way, the charging columns can be reliably supplied with power without being reliant on the energy provision from the mains connection in the specific charging situation of the vehicle. The buffer store can be charged continuously by the mains connection and simultaneously supply energy to the electric vehicles. In this case, the charging current from the mains connection to the buffer store may be lower than the charging current that flows from the buffer store to the electric vehicles. The buffer store thus fulfills the function of a buffer, which temporarily buffers charge and provides said charge when required to a greater extent than the existing mains connection allows.

In accordance with one aspect of the present invention, a method for charging one or more electric vehicles by way of a charging system is provided, said charging system having a charging station, a first charging column, a buffer store for storing energy, a mains connection for providing energy to the charging station and a switching apparatus, wherein the method involves switching the switching apparatus of the charging system in order to conduct the flow of energy from the buffer store and/or the mains connection to the at least one first charging column. In one embodiment, the charging system can be a charging system in accordance with embodiments described herein.

In further exemplary embodiments of the method for charging one or more electric vehicles, the underlying charging station can have at least one second charging column and the method can further involve switching the switching apparatus of the charging system in order to divide the flow of energy from the buffer store and/or from the mains connection of the charging station between the first charging column and the second charging column or to conduct the flow of energy to one of the two charging columns. The switching apparatus can also be designed so that it is possible to charge a battery of the charging system and of the electric vehicle connected to the charging column at the same time. This can be achieved, inter alia, through the use of at least two DC voltage converters per charging column. The method according to aspects of the invention can also involve connection of the buffer store during the charging of at least one electric vehicle while the main charging load is borne by the mains connection, for example when the mains power is too low, in order to charge the electric vehicles connected to the charging station(s) with maximum power.

Further advantages and refinements of the invention will emerge from the description and from the appended drawings.

It is self-evident that the features mentioned above and the features yet to be discussed below may be used not only in the respectively specified combination but also in other combinations or individually without departing from the scope of the present invention.

BRIEF DESCRIPTION OF THE DRAWING

The invention is schematically illustrated in the drawings with reference to embodiments and is described schematically and in detail with reference to the drawings.

DETAILED DESCRIPTION OF THE INVENTION

Figure 1:
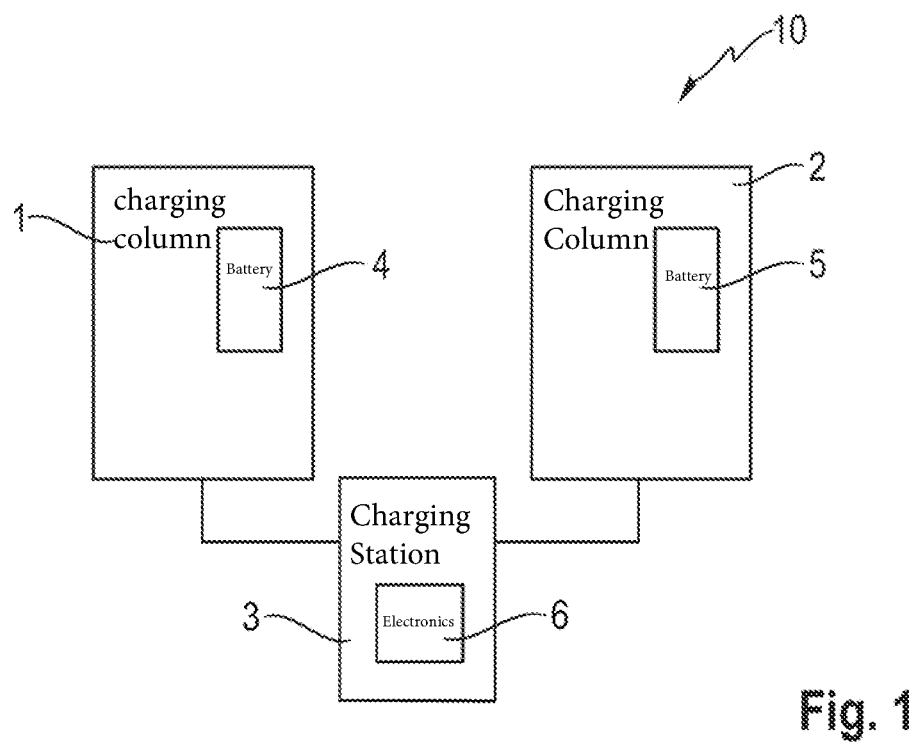
FIG. 1 shows a schematic drawing of a charging system having two charging columns in accordance with embodiments described herein.

FIG. 1 shows a charging system 10 in accordance with embodiments described herein. The charging system 10 may be, for example, a charging system for charging electric automobiles, in particular electrically operated passenger cars. The charging system 10 typically comprises two charging columns 1 and 2. Each of the charging columns 1, 2 can have one or more charging plugs, which can be used to connect a respective electric vehicle for charging. The number of charging columns of a charging system in accordance with embodiments described herein is not limited to two. For example, the charging system may have more than two charging columns. In particular, the charging system 10 according to aspects of the invention may also have just one charging column 1.

In accordance with embodiments described herein, the charging system has a buffer store, which is illustrated in the example shown in FIG. 1 in the form of two batteries 4 and 5. In the example shown in FIG. 1, the first battery 4 of the buffer store is installed in the first charging column 1 and the second battery 5 of the buffer store is installed in the second charging column 2. In accordance with some embodiments described herein, the two batteries 4 and 5 of the buffer store may be of substantially the same size. The charging columns 1 and 2 can be connected to one another in a DC-isolated manner by way of a charging station 3. In the embodiment shown, the charging station 3 has the power electronics system 6 and can further have, for example, a cooling system, processors, measurement apparatuses, switching apparatuses and further elements. In FIG. 1, for the sake of simplicity, the two charging columns 1 and 2 are schematically connected in a DC-isolated manner by the common power electronics system 6, which is arranged in the center of the charging station 3. The charging station 3 can further have a mains connection (not explicitly shown), which is coupled to the power electronics system 6. In the basic shape of the charging system 10 according to aspects of the invention, said charging system can have only the charging station 3 with the power electronics system 6, which is coupled to the first charging column 1.

Although FIG. 1 shows the batteries 4 and 5 of the buffer store of the charging system in the charging columns 1 and 2, other embodiments of the arrangement are also possible. For example, the system according to aspects of the invention can consist of two units: a charging station having the buffer store and the power electronics system (and further elements, as already described by way of example above) on the one hand and the actual charging column having the charging plugs for the electric vehicles on the other hand. In this case, the charging station can be arranged separately from the charging columns, for example at a spacing of a few tens to a few hundreds of meters away.

Although not shown in the figures for the sake of simplicity, the charging system 10 according to aspects of the invention can have several further elements that are necessary for the operation of a charging system for charging an electric vehicle. For example, the charging system can have further elements of the power electronics system, connections, plugs, cables, grounds, control systems, processors, measurement apparatuses etc.

The buffer store in accordance with embodiments described herein can be a battery, in particular a rechargeable battery. In some embodiments, as are shown by way of example in the figures, the buffer store can be divided into two batteries or be divided into a number of batteries that corresponds to the number of charging columns of the charging system according to aspects of the invention. In particular, the division of the batteries can be associated with the individual charging columns.

The integrated buffer store can be designed with capacitances in the range of from approximately 50 kWh to approximately 500 kWh in such a way that a mains connection for supplying energy is superfluous, at least during charging of the electric vehicles. In particular, the buffer store is designed to charge one or more electric vehicles, in particular passenger cars. The capacitance of the buffer store can be dimensioned so that the simultaneously charged electric vehicles can be charged only by the energy from the buffer store and without a flow of energy from the mains connection. As a result, the charging system is not dependent on a mains connection or a mains connection of a specific magnitude. In addition or as an alternative to a buffer store of this kind, the charging system may be able to be connected to a power supply system, in particular to a power supply system having a low system power. Despite a low system power, a high and rapid charging power of the electric vehicle can thus be ensured.

Figure 2:
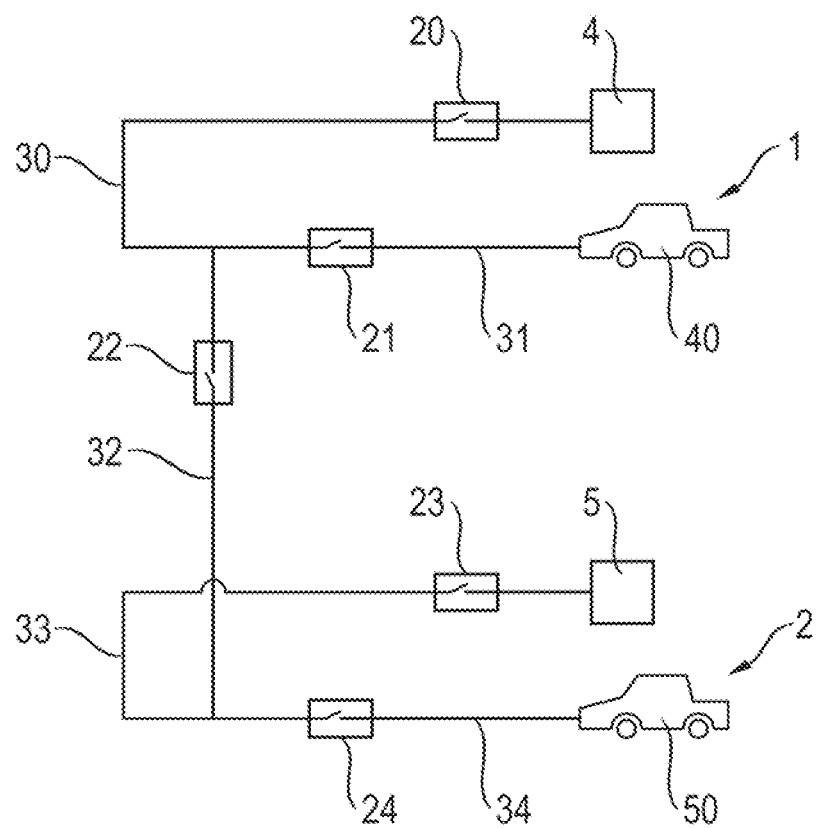
FIG. 2 shows a schematic drawing of a switching apparatus of a charging system having two charging columns in accordance with embodiments described herein.

FIG. 2 shows a switching apparatus of a charging system in accordance with embodiments of the invention. The example of FIG. 2 shows the first battery 4 of the first charging column 1, to which a first electric vehicle 40 to be charged is connected. FIG. 2 furthermore shows a second battery 5 of the second charging column 2 having a second electric vehicle 50 connected thereto. The switching apparatus of the charging system has a plurality of switches, namely a first switch 20, a second switch 21, a third switch 22, a fourth switch 23 and a fifth switch 24. The first electric vehicle 40, which is connected to the first charging column 1, can be connected to the first battery 4 for charging by means of the first switch 20 and the second switch 21 and by means of the first connection 30 and the second connection 31. The second electric vehicle 50 can be connected to the second battery 5 of the second charging column 2 by means of the fourth switch 23 and the fifth switch 24 and by means of the fourth connection 33 and the fifth connection 34. In this case, the current does not have to be divided between the charging points but can be provided at each charging point in full when required. The maximum energy from the batteries for charging is therefore available both to the first electric vehicle 40 and to the second electric vehicle 50.

The switching apparatus shown in FIG. 2, which can correspond in general to at least one part of the power electronics system, also has a third switch 22 and a third connection 32. In accordance with embodiments described here, the third connection 32 connects the first connection 30 of the first charging column 1 to the fourth connection 33 of the second charging column 2. The third switch 22 can establish or disconnect said connection. For example, the first electric vehicle 40, which is connected to the first charging column 1, can therefore also be charged by way of the battery 5 by means of the third connection 32 and the closed third switch 22. In one example, the first electric vehicle 40 can also be charged by means of both batteries, the first battery 4 and the second battery 5. In another example, the second electric vehicle 50 can be connected to the battery 4 of the first charging column 1 by means of the fifth connection 34, the fourth connection 33, the third connection 32 and the first connection 30. Given a corresponding switch position, the second electric vehicle 50 can also be connected to both batteries 4 and 5 of the two charging columns.

As shown in FIG. 2, the first switch 20 and the first battery 4 can be arranged in the first charging column 1 or alternatively also be arranged in the center of the charging station. The situation is similar with the arrangement of the fourth switch 23 and the second battery 5 with respect to the second charging column 2. The switches 21 and 24 can also be arranged in the charging station or the charging column. The switching apparatus, as defined above, can be arranged in the center of the charging station or be arranged distributed over the charging station and the charging columns 1, 2. The third switch 22 can usually be arranged in the charging station.

Figure 3:
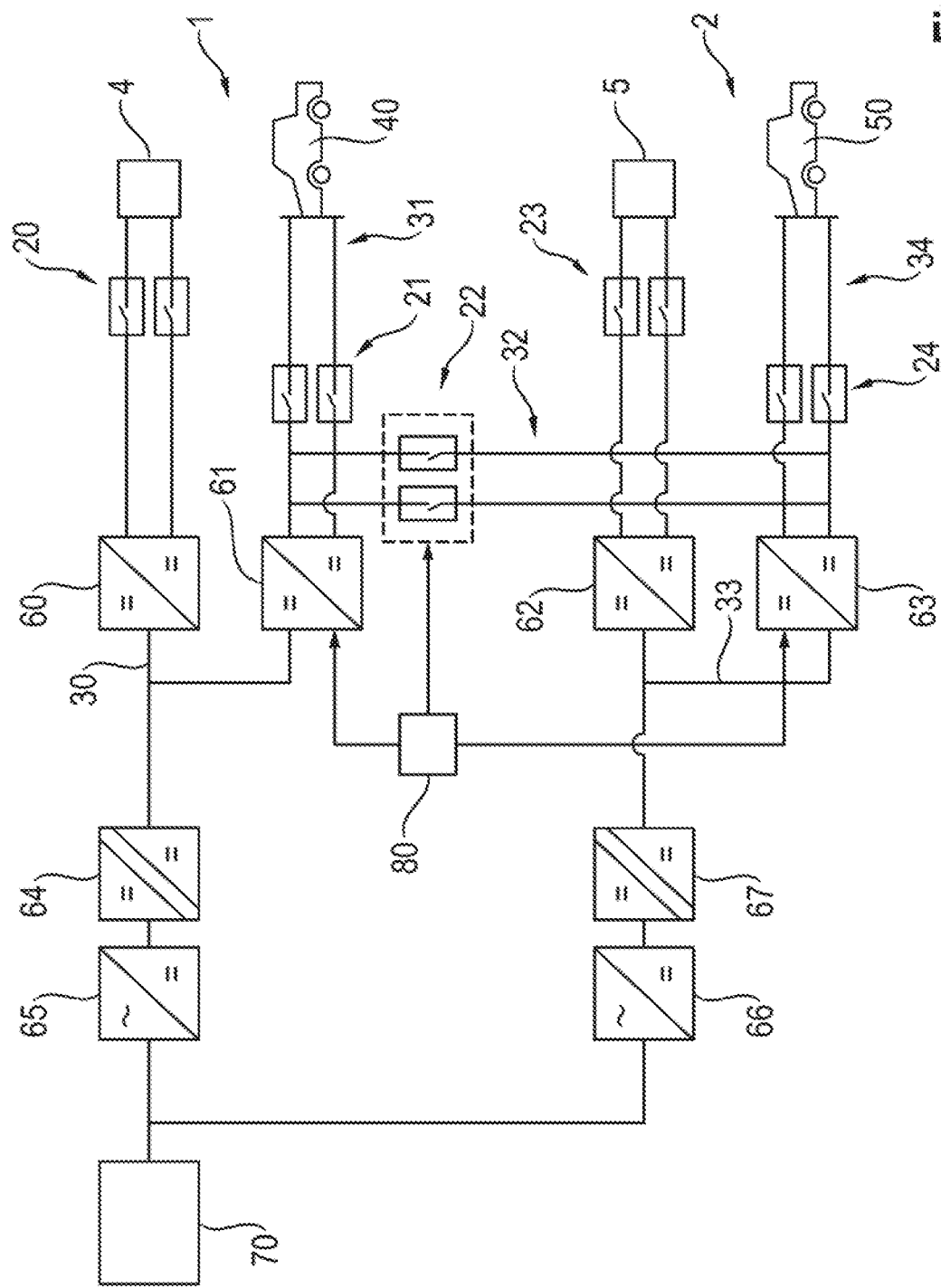
FIG. 3 shows a schematic diagram of a charging system having two charging columns in accordance with embodiments described herein.

FIG. 3 shows a diagram of the system in accordance with embodiments described herein. The right-hand part of the diagram of FIG. 3 comprises the switching apparatus as has been shown and described in simplified form in FIG. 2. Here, the first charging column 1 having the first battery 4 and the first electric vehicle 40 and the second charging column 2 having the second battery 5 and the second electric vehicle 50 can be seen. As described in detail above, the battery paths and current paths of the charging columns 1 and 2 can be connected to one another by the first connection 30, the second connection 31, the third connection 32, the fourth connection 33 and the fifth connection 34 and the first switch 20, the second switch 21, the third switch 22, the fourth switch 23 and the fifth switch 24. The double lines running in each case from the first DC/DC converter 60 to the first battery 4, from the second DC/DC converter 61 to the first electric vehicle 40, from the third DC/DC converter 62 to the second battery 5 and from the fourth DC/DC converter 63 to the second electric vehicle 50 have been illustrated in a manner representative of the positive pole and the negative pole.

The switching topology illustrated by way of example in FIG. 3 can be considered to be advantageous since the DC/DC converters of the charging stations (first charging column 1: first and second DC/DC converters 60, 61; second charging column 2: third and fourth DC/DC converters 62, 63) can be designed for powers that are oriented to the charging operation of an electric vehicle 40, 50 and hence are comparatively more cost-effective and compact, since they only provide somewhat more than half the possible power of a charging point. When the first and second battery 4, 5 are interconnected by means of the third switch 22 for the purpose of charging one of the two electric vehicles 40, 50, the voltage is initially converted at each charging column 1, 2 independently of one another by the associated DC/DC converters. The charging currents are joined only at the end, that is to say between the DC/DC converter 61 and the switch 21 and analogously between the DC/DC converter 63 and the switch 24, with the result that at no point does a charging current that corresponds to the sum of the charging current from the first battery 4 and the second battery 5 flow through the DC/DC converters 60, 61, 62, 63 of the first and second charging column 1, 2.

FIG. 3 also shows a mains connection 70 and parts of the power electronics system of the charging system according to aspects of the invention. In particular, FIG. 3 shows a first rectifier 65 and a second rectifier 66 and also a first DC voltage converter 64 and a second DC voltage converter 67. The mains connection 70 can thus be used for charging the buffer store, in particular for charging the batteries 4 and 5 or else can be used directly for charging the first electric vehicle 40 by means of the second DC/DC converter 61 and/or for charging the second electric vehicle 50 by means of the fourth DC/DC converter 63. The energy of each of the batteries 4 and 5 shown by way of example in FIG. 3 passes through a first DC/DC converter 60 and a second DC/DC converter 61 or a third DC/DC converter 62 and a fourth DC/DC converter 63, that is to say in each case two DC/DC converters, until the battery voltage has been brought to the desired output voltage of the first electric vehicle 40 or the second electric vehicle 50. The power electronics system operates both charging columns 1 and 2 here and can, in some embodiments, be provided in a manner spatially separated therefrom (as explained in more detail above). In FIG. 3, a control unit 80 is likewise provided for the voltage converters, which control unit ensures that the interconnection functions without problems by virtue of it monitoring the charging currents, for example. The use of two respective DC/DC converters per charging column 1, 2 also makes it possible to use comparatively smaller and more cost-effective DC voltage converters, since the voltage swing during charging of the batteries 4, 5 by means of the mains connection 70 and during charging of the electric vehicles 40, 50 by means of the batteries 4, 5 does not have to be provided by a single DC voltage converter.

As can be seen in FIG. 3, the energy transmitted by the common power electronics system is already transmitted to the respective charging columns 1 and 2 as direct current and DC voltage.

Although not shown in the simplified illustration of FIG. 3, the charging system in accordance with embodiments of the invention can have further elements. For example, the charging system can have insulation monitors, grounding apparatuses, further circuits, etc.

Owing to the charging system according to aspects of the invention, it is possible to provide a system for the rapid charging of electric vehicles using high DC voltages and currents.

Furthermore, a method for supplying energy to a charging system for charging one or more electric vehicles is provided. In this case, the charging system can be, in particular, a charging system as has been described herein in accordance with embodiments. The method comprises the provision of a buffer store, which can be coupled to the first charging column and to the second charging column, wherein the buffer store can typically be realized in the form of a battery associated with the two charging columns. The batteries of the buffer store can be joined by the switching apparatus according to aspects of the invention, to which the two charging columns are connected in a DC-isolated manner. In accordance with embodiments described herein, a control apparatus can control the opening and closing of connections by means of the switching apparatus. For example, the control apparatus can determine how the energy of the buffer store is divided over the charging columns or which connections to the batteries of the buffer store are opened or closed depending on the vehicles connected to the charging columns.

The method can comprise further steps, such as the detection of several parameters, for example. Said parameters can comprise the number of connected vehicles, the state of charge of the connected vehicles, the state of charge of the buffer store, the duration of the connection to the vehicle and the like. In one embodiment, the detection of the parameters, the storage of the parameters, the calculation of the consequences, the optimization of the individual charging operations, the corresponding control signal generation etc. can be carried out by a processor unit.

The provision of the buffer store can also comprise the provision of a plurality of batteries corresponding to the number of charging columns and the provision of a corresponding circuit, as has been explained in more detail in FIG. 2, for example.

What is claimed is:

1. A charging system for charging an electric vehicle, comprising:
    a charging station;
    a first charging column, which has one or more charging plugs;
    a second charging column, which has one or more charging plugs;
    a buffer store for storing energy, wherein the buffer store has a first battery for the first charging column and a second battery for the second charging column and wherein the first battery is configured to be coupled to the second charging column and the second battery is configured to be coupled to the first charging column;
    a mains connection for providing energy to the charging station; and
    a switching apparatus, which is configured to conduct a flow of energy from at least one of the buffer store and the mains connection to the first charging column.

2. The charging system as claimed in claim 1, wherein the switching apparatus is configured to distribute the flow of energy from at least one of the buffer store and the mains connection over the two charging columns or to conduct said flow of energy to one of the two charging columns.

3. The charging system as claimed in claim 1, wherein the batteries of the buffer store are arranged in the charging columns of the charging system.

4. The charging system as claimed in claim 1, wherein the switching apparatus is configured in such a way that a maximum energy of the charging system is provided at each of the two charging columns.

5. The charging system as claimed in claim 1, wherein the two charging columns are operated by a respective power electronics system whose powers can likewise be interconnected by the switching apparatus.

6. The charging system as claimed in claim 1, wherein a capacitance of the buffer store is configured in such a way that at least two electric vehicles can be supplied with energy.

7. The charging system as claimed in claim 1, wherein the switching apparatus is configured to conduct a flow of energy from the buffer store and the mains connection to the first charging column.

8. A method for charging an electric vehicle at a charging system, wherein the charging system comprises (i) a charging station, (ii) a first charging column having one or more charging plugs, (iii) a second charging column having one or more charging plugs, (iv) a buffer store for storing energy, wherein the buffer store has a first battery for the first charging column and a second battery for the second charging column and wherein the first battery is configured to be coupled to the second charging column and the second battery is configured to be coupled to the first charging column, (v) a mains connection for providing energy to the charging station, and (vi) a switching apparatus, wherein the method comprises:
    switching the switching apparatus of the charging system in order to conduct a flow of energy from at least one of the buffer store and the mains connection to the first charging column.

9. The method as claimed in claim 8, wherein the switching apparatus of the charging system is switched in such a way that the flow of energy from at least one of the buffer store and the mains connection of the charging station is divided between the first charging column and the second charging column or is conducted to one of the two charging columns.

10. The method as claimed in claim 8, wherein the switching step comprises switching the switching apparatus of the charging system in order to conduct a flow of energy from the buffer store and the mains connection to the first charging column.

* * * * *